United States Patent [19]

Harris et al.

[11] Patent Number: 5,450,441
[45] Date of Patent: Sep. 12, 1995

[54] MECHANISM FOR MONITORING QUALITY OF DIGITAL TELEPHONE LINK BASED UPON RATE OF OCCURRENCE OF ILLEGAL BIPOLAR VIOLATIONS

[75] Inventors: Norman R. Harris; Don A. Waring, both of Madison; Clint S. Coleman, Huntsville, all of Ala.

[73] Assignee: Adtran, Huntsville, Ala.

[21] Appl. No.: 168,075

[22] Filed: Dec. 14, 1993

[51] Int. Cl.⁶ .................. H04B 3/46; H04B 17/00
[52] U.S. Cl. .................. 375/224; 375/289; 375/260; 455/226.1; 341/69
[58] Field of Search .................. 375/10, 17, 38, 40; 455/226.1; 371/20.1, 30; 370/13; 341/69, 73

[56] References Cited

U.S. PATENT DOCUMENTS

| 4,697,265 | 9/1987 | Nozue | 375/10 X |
| 5,216,697 | 6/1993 | Ohnuki | 375/10 X |
| 5,220,581 | 6/1993 | Ferraiolo et al. | 375/10 |

*Primary Examiner*—Stephen Chin
*Assistant Examiner*—Bryan E. Webster
*Attorney, Agent, or Firm*—Charles Wands

[57] ABSTRACT

To prevent the occurrence of an anomaly on a single data-sourcing slave channel from causing continuous transmission on that channel and thereby tying up the entirety of a multipoint network, a signal transmission quality monitoring mechanism is incorporated into the office channel unit of each data-sourcing channel. The signal transmission quality monitoring mechanism controls the participation of each monitored digital communications channel on the basis of a measure of the quality of digital signals received from each monitored channel. The control software of each slave channel's office channel unit is configured to include a bipolar violation detector which monitors the channel for the presence of errors exhibited as bipolar violations of alternate mark inversion (AMI)-formatted digital signals. In response to the occurrence of a prescribed number of illegal bipolar violations within a predetermined number of received signals (e.g. three errored seconds within a sliding ten second window), the channel is declared to be of "BAD" quality, and the office channel unit sends an 'ABNORMAL' station code upstream to a multipoint junction unit. Thereafter, during continued monitoring of the channel, in response to the lapse of a predetermined period of time (e.g. 30 seconds) during which the prescribed number of illegal bipolar violations has not occurred within the predetermined number of received digital signals, the channel is declared to be "GOOD", so that participation of the channel for the transmission of digital signals to the master site may be resumed.

18 Claims, 3 Drawing Sheets

MECHANISM FOR MONITORING QUALITY OF DIGITAL TELEPHONE LINK BASED UPON RATE OF OCCURRENCE OF ILLEGAL BIPOLAR VIOLATIONS

FIELD OF THE INVENTION

The present invention relates in general to digital communication systems, and is particularly directed to a mechanism incorporated in an office channel unit of a multipoint digital telephone communication network for controlling the participation of each of a plurality of monitored digital communications channels on the basis of a measure of the quality of digital signals received from each monitored channel.

BACKGROUND OF THE INVENTION

Multipoint digital data services networks are frequently employed to link a plurality of (digital data-sourcing) sites to a remotely located (information processing) site. A typical application of a relatively large multipoint network is a lottery system, where thousands of data terminals that source lottery numbers input by individual players are distributed over a large (statewide) geographical area. A reduced complexity example of a typical multipoint network is diagrammatically illustrated in FIG. 1, as comprising a first (information processing) data terminal equipment 'master' site 11 located at a west end (as viewed in the Figure) of the network, and a plurality of second through fifth (data-sourcing) data terminal equipment 'slave' sites 21, 22, 23 and 24 dispersed at east ends of the network.

Each of the data-sourcing sites 21, 22, 23 and 24 is linked to master site 11 by way of a multipoint junction unit 31, which is coupled to each of a plurality of respective (four wire) local loop channels or branches 41, 42, 43, 44 that serve sites 21, 22, 23 and 24, respectively, and to a 'control' channel 51 that forwards data transmitted from any of the sourcing sites to master site 11. Coupled in respective ones of local loop channels 41–44 are office channel units (OCUs) 61–64 and communication services units (data service/channel service units (DSU/CSU)) 71–74 that interface to each data terminal equipment site 21–24 by way of a standard digital transmission link (such as RS-232, V.35). Similarly, master channel 51 contains an office channel unit 81 coupled to multipoint junction unit 31 and a (DSU/CSU) 91 coupled to data terminal equipment site 11.

In the course of normal operation, multipoint junction unit 31 is operative to combine respective digital data bytes as they are sourced (on a normally non-continuous basis) from sites 21–24 on channels 41–44 and outputs the data over master channel 51 to data terminal site 11. An anomaly on one of the local loop channels 41–44, for example between a DSU and a office channel unit, may cause that local loop channel to become continuously active, which ties up the entire network, so that no other channel can transmit data upstream to the master site, and therefore effectively prevents all data transmission for the entire network in the upstream direction.

Reasons for a channel going continuously active, or 'streaming' data, include bad cable splices, one or more broken wires, the DSU not being connected or powered, and an excessive noise condition. Because the entire network is disabled whenever a single channel becomes continuously active, the location of which channel is faulty is relatively hard to detect.

SUMMARY OF THE INVENTION

In accordance with the present invention, the potential likelihood of an anomaly on a single data-sourcing channel causing continuous transmission on that channel and thereby tying up the entire network, and without indicating which channel is the source of the problem, is effectively obviated by a signal transmission quality monitoring mechanism that may be incorporated into the office channel unit of each data-sourcing channel of a multipoint digital telephone communication network. The signal transmission quality monitoring mechanism of the invention is operative to control the participation of each monitored digital communications channel on the basis of a measure of the quality of digital signals received from each monitored channel.

More particularly, pursuant to the invention, the control software of each slave channel's office channel unit is configured to include a bipolar violation detector which monitors the channel for the presence of errors exhibited as illegal bipolar violations of alternate mark inversion (AMI)-formatted digital signals. For non-secondary channel operation, some bipolar violations are defined or legal; for secondary channel operation all bipolar violations are illegal. In response to the occurrence of a prescribed number of illegal bipolar violations within a predetermined number of received signals (e.g. three errored seconds within a sliding ten second window), the channel is declared to be of "BAD" quality, or unacceptable for the transmission of digital signals, and the office channel unit sends an "ABNORMAL" station code to the master site. Thereafter, during continued monitoring of the channel, in response to the lapse of a predetermined period of time (e.g. 30 seconds) during which the prescribed number of errors has not occurred within the predetermined number of received digital signals, the channel is declared to be of "GOOD" quality, or acceptable for the transmission of digital signals, so that use of the channel for the transmission of digital signals to the master site may be resumed.

The office channel unit includes a bipolar signal extraction circuit for extracting positive and negative signal components of a monitored (AMI) format signal. The extraction circuit comprises a data slicer and a peak detector. The output of the peak detector is coupled to a threshold generator, which provides a variable threshold for controlling the signal level at which the data slicer operates. The data slicer provides respective positive and negative excursion outputs to a bipolar violations detector and a data recovery circuit. The bipolar violations detector is operative to provide an output flag to the office channel unit's processor in response to the occurrence of two consecutive pulses of the same polarity, corresponding to a bipolar violation in a received data byte.

The processor is operative to apply the output of the bipolar violations detector to a signal quality processing routine. Based upon the results of this analysis, the processor controllably allows the output data byte from data recovery circuit to be forwarded on to the multipoint junction unit, or transmits an ABNORMAL station code. Which byte will be sent (data or abnormal code) is based upon the degree of errors exhibited as illegal bipolar violations of the AMI-formatted digital signals on the monitored channel.

Thus, as long as signal quality, as determined by the number of errored seconds received within a sliding time window is no greater than a prescribed tolerance rate (e.g. three within ten seconds), the channel is declared to be of good quality and recovered data from the local loop is allowed to be transmitted to the multipoint junction unit. On the other hand, should the monitored signal quality degrade to less than an acceptable tolerance level, the channel is declared to be of bad quality until channel quality has been determined to be continuously satisfactory over a longer time out interval (e.g. 30 seconds). whereupon use of the channel for data transmission is resumed. Declaring a channel "BAD" allows the source of the problem to be readily identified.

DETAILED DESCRIPTION

Figure 1:
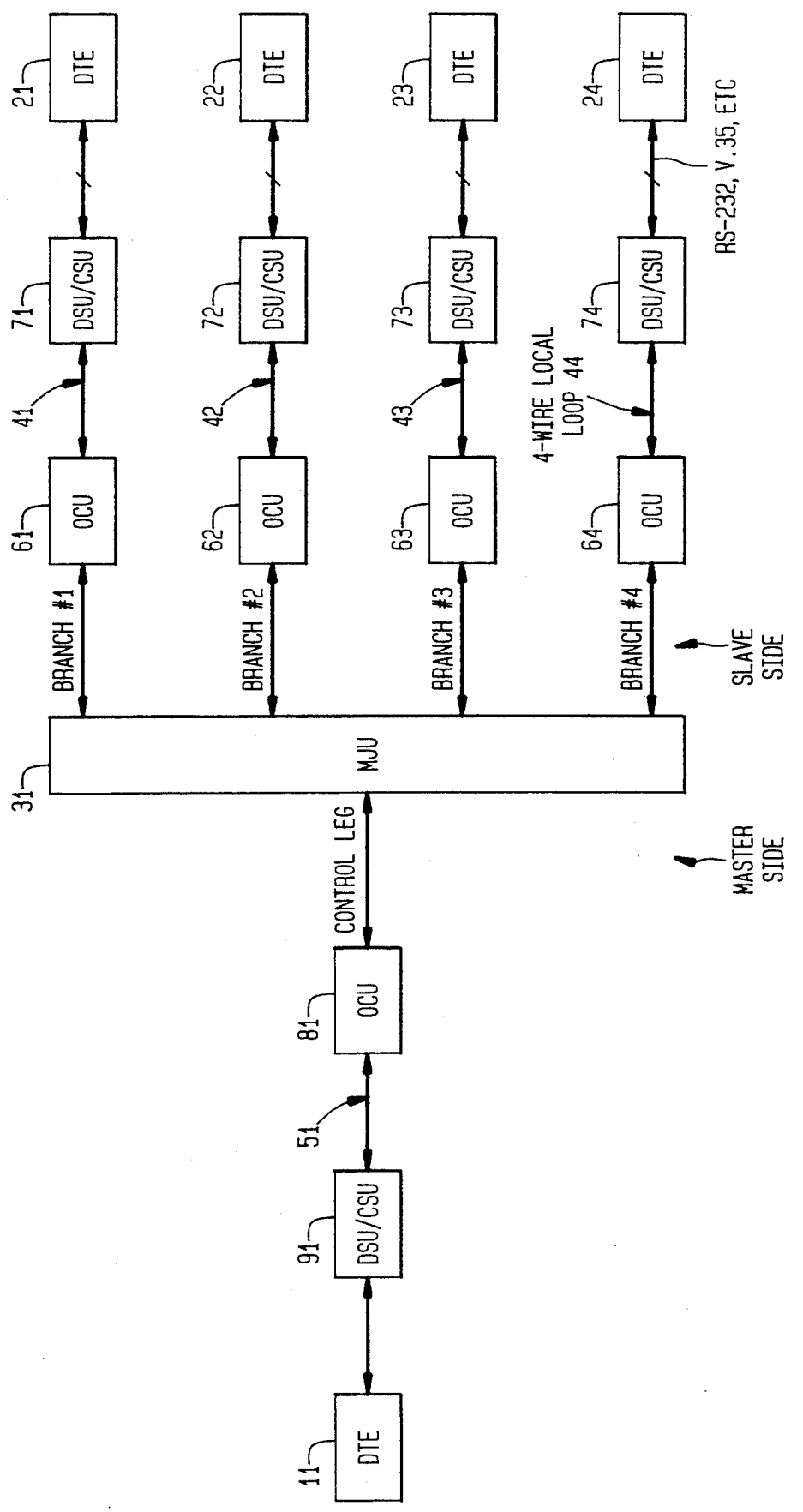
FIG. 1 diagrammatically illustrates a reduced complexity example of a typical multipoint network.

Before describing in detail the quality monitoring mechanism in accordance with the present invention, it should be observed that the present invention resides in what is effectively a modification of the hardware of a conventional office channel unit receiver and an augmentation of the control software employed by a respective slave channel office channel unit's microcontroller. The details of the circuitry of the office channel unit are otherwise essentially unaffected. As a consequence, the configuration of such a modified office channel unit and the manner in which it is interfaced with other communication equipment of the telephone network have been illustrated in the drawings by readily understandable block diagrams which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

As pointed out briefly above, the potential likelihood that an anomaly on a single data-sourcing channel will cause continuous transmission on that channel and thereby tie up the entire network is obviated in accordance with the signal transmission quality monitoring mechanism according to the present invention, which is incorporated into the office channel unit of each slave channel of a multipoint digital telephone communication network. When so incorporated, the signal transmission quality monitoring mechanism is operative to control the participation of each monitored digital communications channel on the basis of the quality of digital signals received from each monitored channel. For purposes of providing a non-limitative example, the office channel unit may correspond to that employed in an office channel unit-data port (OCU-DP) Model No. 1104005L9, manufactured by Adtran Corp., Huntsville, Ala.

Figure 2:
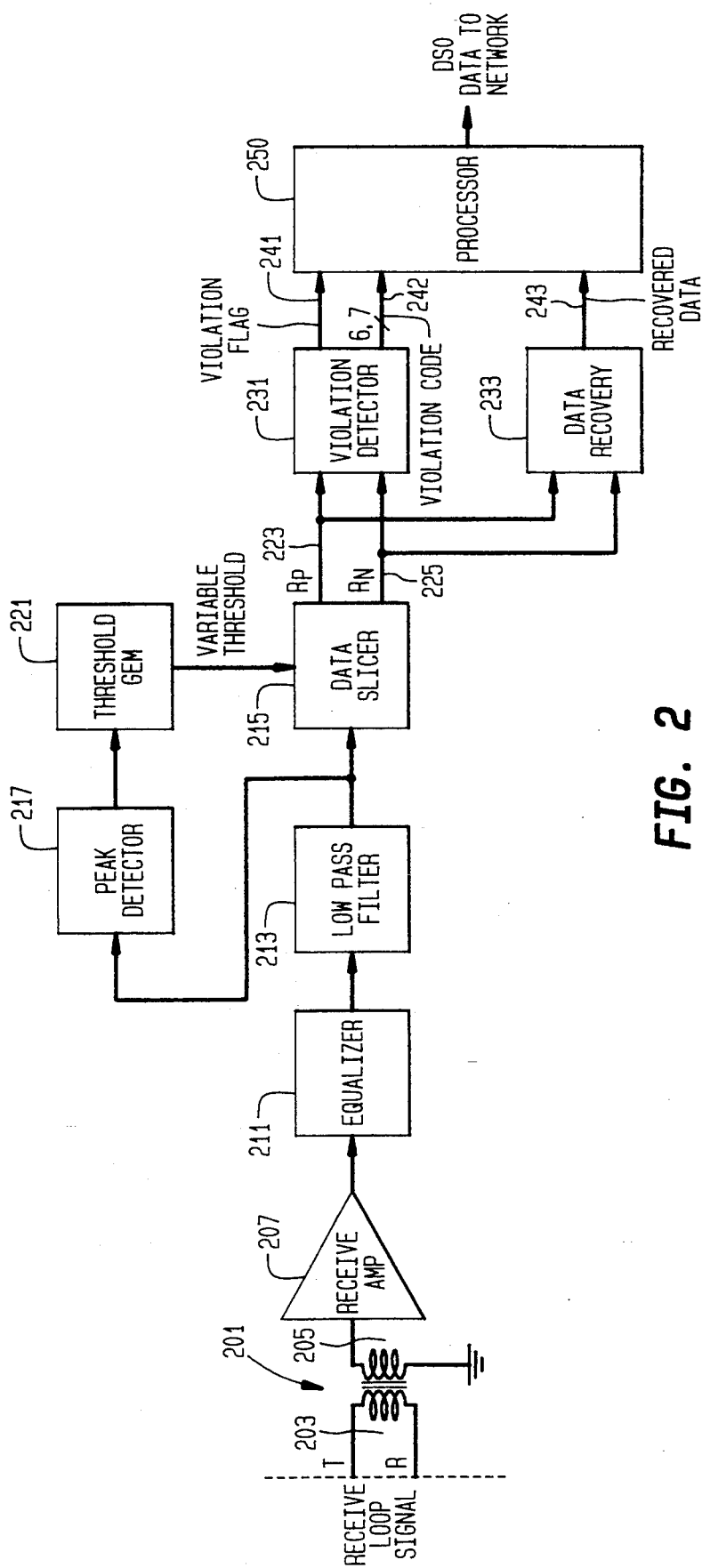
FIG. 2 diagrammatically illustrates receiver circuitry for equipping an office channel unit to monitor signal quality in accordance with the present invention.

Receiver circuitry for equipping an office channel unit to monitor signal quality in accordance with the present invention is diagrammatically illustrated in FIG. 2. As noted earlier, digital signalling in a telephone network is customarily effected using alternate-mark-inversion (AMI) bipolar format. The office channel unit includes front end circuitry which is operative to extract the respective positive and negative signal portions of the monitored channel, which feeds the extracted signals to a downstream processor for determining the quality of the monitored signal.

More particularly, the bipolar signal extraction front end of the office channel unit comprises a loop-coupling transformer 201, the primary winding side 203 of which is coupled to an input (tip/ring) pair of the local loop channel being monitored, such as channel 41 in FIG. 1. The secondary side 205 of input winding 201 has one terminal coupled to a potential reference terminal (e.g. ground) and the other terminal coupled to a receive amplifier 207. The output of receiver amplifier 207 is coupled through an equalizer 211 and low pass filter 213 to circuitry for extracting the positive and negative signal components of the (AMI) format signal. This circuitry comprises a data slicer 215 and a peak detector 217. The output of peak detector 217 is coupled to a threshold generator 221, the output of which provides a variable threshold for controlling the signal level at which data slicer 215 operates. For positive signal excursions that exceed the threshold level, data slicer 215 outputs a signal on line 223; for negative signal excursions that exceed the threshold level, data slicer 215 outputs a signal on line 225.

Each of lines 223 and 225 is coupled to a bipolar violations detector 231 and a data recovery circuit 233. Bipolar violations detector 231, which may comprise a conventional bipolar violations detector circuit, such as that described in the U.S. Pat. No. 3,967,060 to Subramanian, issued Jun. 29, 1976, and in an article referenced in the '060 Patent, entitled "Monitors Take the Pulse Of T-1 Transmission Lines," by R. Blair et al, Bell Laboratories Record, February 1973, is operative to provide an output flag on line 241 to a downstream processor 250 in response to the occurrence of a bipolar violation. Each received code byte (i.e. a seven bit code for a 56K bit channel, or a six bit code for sub-rate signalling, is latched in violation detector 231, and is ported to output line 242 so that it may be read by processor 250. (Examples of six bit code violations for sub-rate signalling are set forth below in Table 1.) Also ported to processor 250 is the data output link 243 from data recovery circuit 233.

Figure 3:
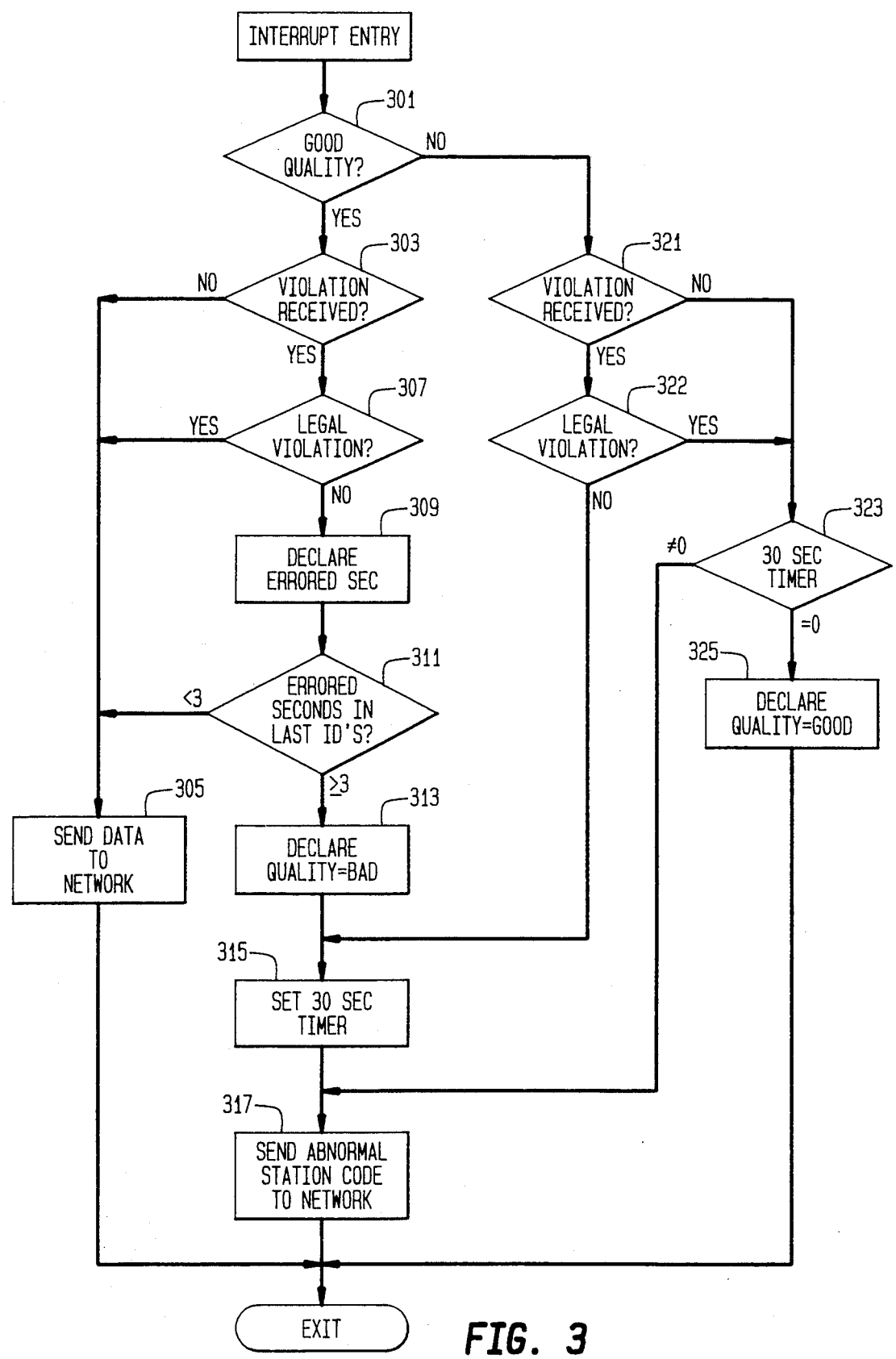
FIG. 3 illustrates a signal quality processing routine for analyzing the output of the bipolar violations detector of the office channel unit receiver of FIG. 2.

Processor 250 is operative to apply the output of violations detector 231 to the (interrupt-driven for each received data byte) signal quality processing routine diagrammatically illustrated in the flow chart of FIG. 3, to be described. Based upon the results of this analysis, processor 250 will controllably transmit either the output data from data recovery circuit 233, or an ABNORMAL station code, to multipoint junction unit 31, based upon the degree of errors exhibited as illegal bipolar violations of the AMI-formatted digital signals on the monitored channel. In particular, should the rate of occurrence of detected illegal bipolar violations exceed a prescribed threshold, (e.g. three errored seconds within a sliding ten second window), processor 250 declares the monitored channel to be of "bad quality"- (i.e. unacceptable for the transmission of digital signals), and sends an 'ABNORMAL' station code (e.g. $9E_{hex}$)

to master site 11. Thereafter, during continued monitoring of the channel, if the quality of the data improves to a satisfactory level, namely, in response to the lapse of a predetermined period of time (e.g. 30 seconds) during which the prescribed number of errors has not occurred within the predetermined number of received digital signals, the channel is redeclared to be "good quality", or acceptable for the transmission of digital signals, so that use of the channel for the transmission of digital signals to the master site may be resumed.

Referring to FIG. 3, a first query step 301 of the signal quality monitoring routine inquires whether the quality of the monitored channel has been declared to be "GOOD" or "BAD". Upon initialization, the quality of a respective channel is assumed to be "GOOD", so that when the routine of FIG. 3 is first executed, the answer to step 301 is YES, and the process proceeds to query step 303. In step 303 the routine looks to see if violation detector 231 has asserted a bipolar violation flag on line 241 for the byte of interest. If the bipolar violation flag on line 241 has not been asserted, then the answer to step 303 is NO, and the recovered data byte on link 243 is forwarded on from data recovery circuit 233 to the multipoint junction unit 31 for transmission to master site 11, as indicated by step 305, and the routine is exited until called up by interrupt for the next received data byte.

If a bipolar violation flag has been asserted by violation detector 231 (the answer to step 303 is YES) for the byte being processed, the routine transitions to query step 307. In step 307 the processor examines the contents of the latched byte on line 242 from violation detector 231, to determine whether the violation is a 'legal' violation. As listed in Table 1, below, for non-secondary channel (56K) operation, each of four of the eight possible bipolar violations codes is associated with its own predefined control function (such as 'execute loopback') for auxiliary network operations. The remaining four codes for non-secondary channel signalling are undefined and therefore illegal. For secondary channel operation, all code violations are illegal.

TABLE 1

| CHANNEL CODE | NON-SECONDARY CHANNEL OPERATION | SECONDARY OPERATION |
|---|---|---|
| 000x0v | defined | undefined |
| 001x0v | undefined | undefined |
| 010x0v | defined | undefined |
| 011x0v | undefined | undefined |
| 100x0v | undefined | undefined |
| 101x0v | defined | undefined |
| 110x0v | undefined | undefined |
| 111x0v | defined | undefined |

If the bipolar violation code is defined (legal), the answer to query step 307 is YES, and the routine transitions to step 305, so that the recovered data on link 243 is forwarded on to multipoint junction unit 31 for transmission to master site 11, as described above, and the routine is exited until called up by interrupt upon receipt of the next byte of data. If, on the other hand, step 307 has determined that the bipolar violation code is undefined (illegal), i.e. the answer to step 307 is YES, the routine transitions to step 309, which causes an errored second to be declared.

Next, in query step 311 the number of errored seconds declared within a prescribed sliding time interval (for example, during the last ten seconds) is examined. If the number of errored seconds is no greater than a preset threshold value (e.g. three), the output of query step 311 is NO, and the routine transitions to step 305, so that the recovered data byte on link 243 may be forwarded to multipoint junction unit 31 for transmission to master site 11, as described above. However, if the number of errored seconds is greater than the preset threshold value, indicative of a poor quality channel, the output of query step 311 is YES, and the routine transitions to step 313, wherein the processor causes the channel quality (originally set to be "GOOD") to be labelled as "BAD" quality. Next, in step 315, a (30 second) timeout is initiated, and in step 317 an ABNORMAL data code (e.g. $9E_{hex}$) is injected into the data stream in place of the normal data for that channel and forwarded to multipoint junction unit 31. The routine is exited until the next received byte interrupt.

As long as a channel is labelled as a "BAD" quality channel, the answer to step 301 is NO, and the routine bypasses the process flow described above and transitions to query step 321. In query step 321, the routine looks to see if a bipolar violation flag has been asserted for the byte of interest, corresponding to the generation of a bipolar violation flag on line 241, as described previously. If the bipolar violation flag has been set (the answer to step 321 is YES), the routine transitions to query step 322, which examines the contents of the byte on link 242 from violation detector 231, to determine whether the code violation is a legal violation, as described above with reference to Table 1. If the detected bipolar violation code is illegal, the answer to step 322 is NO and the routine transitions to step 315, which reinitiates the (30 second) timeout. Then, in step 317, an ABNORMAL data code (e.g. $9E_{hex}$) is injected into the data stream in place of the normal data for that channel and forwarded to multipoint junction unit 31. The routine is exited until the next received byte interrupt.

If the answer to query step 322 is YES, the routine transitions to time-out query step 323, to determine whether the timeout initiated in step 315 has expired. If the answer to step 323 is NO (the 30 second time-out has not yet expired), the routine transitions to step 317, which again causes an ABNORMAL data code (e.g. $9E_{hex}$) to be injected into the data stream in place of the normal data byte for that channel and forwarded to multipoint junction unit 31. If the answer to step 323 is YES, the routine transitions to step 325, wherein the processor causes the channel quality to be labelled as "GOOD" quality. The routine is then exited until the next received byte interrupt is asserted.

Thus, as long as signal quality, as determined by the number of errored seconds received within a sliding time window, is no greater than a prescribed tolerance rate (e.g. three within ten seconds), the channel is declared to be of good quality and recovered data bytes from the local loop are allowed to be forwarded on to the multipoint junction unit 31. On the other hand, should monitored signal quality degrade to less than an acceptable tolerance level (in excess of three errored seconds in the last ten seconds, in the present example), the monitored channel is declared to be of bad quality. This "BAD" quality label continues to be asserted, with the channel taken out of service, until channel quality has been determined to be continuously satisfactory over a longer time out interval (e.g. 30 seconds), whereupon use of the channel for data transmission is resumed. Declaring a channel "BAD" allows the source of the problem to be readily identified.

As will be readily appreciated from the foregoing description, the potential likelihood of an anomaly on a single data-sourcing channel causing continuous transmission on that channel and thereby tying up the entire network, is effectively obviated by the signal transmission quality monitoring mechanism according to the present invention, which may be incorporated into the office channel unit of each slave channel of a multipoint digital telephone communication network, and is operative to control the participation of each monitored digital communications channel on the basis of a measure of the quality of digital signals received from each monitored channel.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of controlling the operation of a multichannel digital communication network, having a plurality of digital communications channels by way of which respective ones of a plurality of first sites transmit digital signals to a multipoint site, which combines digital signals transmitted over said plurality of digital communication channels and forwards a combined digital signal over a combined digital communication channel to a second site, on the basis of a measure of the quality of digital signals received by way of any of said plurality of digital communications channels, said method comprising the steps of:

(a) for each of said plurality of digital communications channels, monitoring digital signals received thereover for the presence of errors;
   (b) in response to the presence of a prescribed number of errors within a predetermined number of said received digital signals in a respective one of said plurality of digital communication channels, declaring said respective one of said plurality of digital communications channels to be unacceptable for the transmission of digital signals thereover and causing the participation of said respective communications channel for the transmission of digital signals to be interrupted, preventing error-containing signals sourced from a respective first site, that is associated with said respective communications channel, from being transmitted to said multipoint site; and
   (c) in response to the lapse of a predetermined period of time during which said prescribed number of errors has not occurred within said predetermined number of said received digital signals after declaring said respective communications channel unacceptable, declaring said respective digital communications channel to be acceptable for the transmission of digital signals thereover and causing the participation of said respective communications channel for the transmission of digital signals to be resumed.

2. A method according to claim 1, wherein said digital signals comprise bipolar signals, step (a) comprises monitoring bipolar signals received from said each of said plurality of digital communications channels for the presence of illegal bipolar violations therein, and step (b) comprises, in response to a prescribed number of illegal bipolar violations occurring within a predetermined period of time, declaring said respective digital communications channel to be unacceptable for the transmission of digital signals thereover and causing the participation of said respective communications channel for the transmission of digital signals to be interrupted.

3. A method according to claim 2, wherein step (c) comprises, in response to the lapse of a predetermined period of time during which said prescribed number of illegal bipolar violations has not occurred after declaring said respective communications channel unacceptable, declaring said respective digital communications channel to be acceptable for the transmission of digital signals thereover and causing the participation of said respective communications channel for the transmission of digital signals to be resumed.

4. A method according to claim 1, wherein said digital signals comprise bipolar signals, step (a) comprises monitoring bipolar signals received from said each of said plurality of digital communications channels for the presence of predefined bipolar violations therein, and step (b) comprises, in response to a prescribed number of said predefined bipolar violations occurring within a predetermined period of time, declaring said respective digital communications channel to be unacceptable for the transmission of digital signals thereover and causing the participation of said respective communications channel for the transmission of digital signals to be interrupted.

5. A method according to claim 4, wherein step (c) comprises, in response to the lapse of a predetermined period of time during which said prescribed number of said predefined bipolar violations has not occurred after declaring said respective communications channel unacceptable, declaring said respective digital communications channel to be acceptable for the transmission of digital signals thereover and causing the participation of said respective communications channel for the transmission of digital signals to be resumed.

6. A method according to claim 1, wherein said digital signals comprise bipolar signals which may include predefined acceptable bipolar violations and unacceptable bipolar violations, step (a) comprises monitoring bipolar signals received from said each of said plurality of digital communications channels for the presence of violations therein, and step (b) comprises, in response to step (a) detecting the occurrence of a prescribed number of unacceptable bipolar violations within a predetermined period of time, declaring said respective digital communications channel to be unacceptable for the transmission of digital signals thereover and causing the participation of said respective communications channel for the transmission of digital signals to be interrupted.

7. A method according to claim 6, wherein step (c) comprises, in response to the lapse of a predetermined period of time during which said prescribed number of unacceptable bipolar violations has not occurred, declaring said respective digital communications channel to be acceptable for the transmission of digital signals thereover and causing the participation of said respective communications channel for the transmission of digital signals to be resumed.

8. A method according to claim 1, wherein each digital communications channel includes an office channel unit disposed at a first portion thereof and a communication services unit disposed at a second portion thereof, and wherein steps (a)-(c) are carried out by way of said office channel unit for digital signals transmitted over said each digital communications channel from said communication services unit at said second portion thereof.

9. For use with a digital communications network having an office channel unit disposed at a first network site, a data services unit disposed at a second network site, and a communications channel between said first and second network sites for conveying bipolar digital signals from said data services unit to said office channel unit, a control mechanism, provided within said office channel unit, for controlling the participation of said communications channel in said digital communications network comprising:
 a bipolar violations detector which is operative to monitor bipolar signals received from said digital communications channel for the presence of illegal bipolar violations; and
 a signal processing unit which is coupled to said bipolar violations detector and is operative, in response to the presence of a prescribed number of illegal bipolar violations within a predetermined number of said received digital signals, to declare said digital communications channel to be unacceptable for the transmission of digital signals thereover, and to cause participation of said communications channel for the transmission of bipolar signals to be interrupted and, in response to the lapse of a predetermined period of time during which said prescribed number of illegal bipolar violations has not occurred within said predetermined number of said received signals after said communications channel having been declared to be unacceptable, to cause said digital communications channel to be declared acceptable for the transmission of bipolar signals thereover, whereby participation of said communications channel for the transmission of bipolar signals may be resumed.

10. A control mechanism according to claim 9, wherein said signal processing unit is operative, in response to a prescribed number of bipolar errors occurring within a predetermined period of time, to declare said digital communications channel to be unacceptable for the transmission of bipolar signals thereover and to cause participation of said communications channel for the transmission of bipolar signals to be interrupted.

11. A mechanism according to claim 10, wherein said signal processing unit is operative, in response to the lapse of a predetermined period of time during which said prescribed number of illegal bipolar violations has not occurred, to declare said digital communications channel to be acceptable for the transmission of digital signals thereover, whereby participation of said communications channel for the transmission of bipolar signals may be resumed.

12. A mechanism according to claim 9, wherein said bipolar violations detector is operative to monitor bipolar signals received from said digital communications channel for the presence of prescribed non-secondary channel bipolar violations.

13. A mechanism according to claim 9, wherein said bipolar violations detector is operative to monitor bipolar signals received from said digital communications channel for the presence of any secondary channel bipolar violations.

14. For use with a digital communications network having a multipoint junction unit connected by way of a plurality of first communication channels to digital terminal devices at a plurality of first network sites and connected by way of a second communication channel to a digital terminal device at a second network site, each of respective ones of said first communication channels having an office channel unit for conducting digital communications by way of a bipolar signalling format with a communication services unit serving a respective second network site, a control mechanism, provided within said office channel unit, for controlling the participation of said respective first communications channel in said digital communications network comprising:
 a bipolar violations detector which is operative to monitor bipolar signals received via said first digital communications channel from said communication services unit for the presence of illegal bipolar violations; and
 a signal processing unit which is coupled to said bipolar violations detector and is operative, in response to the presence of a prescribed number of illegal bipolar violations within a predetermined number of bipolar signals from said communications services unit, to declare said digital communications channel to be unacceptable, whereby participation of said communications channel for the transmission of digital signals from its associated first network site to said second network site is interrupted and, in response to the lapse of a predetermined period of time during which said prescribed number of illegal bipolar violations has not occurred within said predetermined number of said received signals after said communications channel having been declared to be unacceptable, to cause participation of said digital communications channel to be declared acceptable, whereby the transmission of digital signals from said associated first network site to said second network site may be resumed.

15. A control mechanism according to claim 14, wherein said signal processing unit is operative, in response to a prescribed number of bipolar errors occurring within a predetermined period of time, to declare said digital communications channel to be unacceptable for the transmission of bipolar signals thereover and to cause participation of said communications channel for the transmission of bipolar signals to be interrupted.

16. A mechanism according to claim 15, wherein said signal processing unit is operative, in response to the lapse of a predetermined period of time during which said prescribed number of illegal bipolar violations has not occurred, to declare said digital communications channel to be acceptable for the transmission of digital signals thereover, whereby participation of said communications channel for the transmission of bipolar signals may be resumed.

17. A mechanism according to claim 14, wherein said bipolar violations detector is operative to monitor bipolar signals received from said digital communications channel for the presence of prescribed non-secondary channel bipolar violations.

18. A mechanism according to claim 14, wherein said bipolar violations detector is operative to monitor bipolar signals received from said digital communications channel for the presence of any secondary channel bipolar violations.

* * * * *